July 18, 1939.   B. A. LINDERMAN   2,166,165
FLUID OPERATED PRESSURE TRANSMISSION DEVICE
Filed July 5, 1935   2 Sheets-Sheet 1
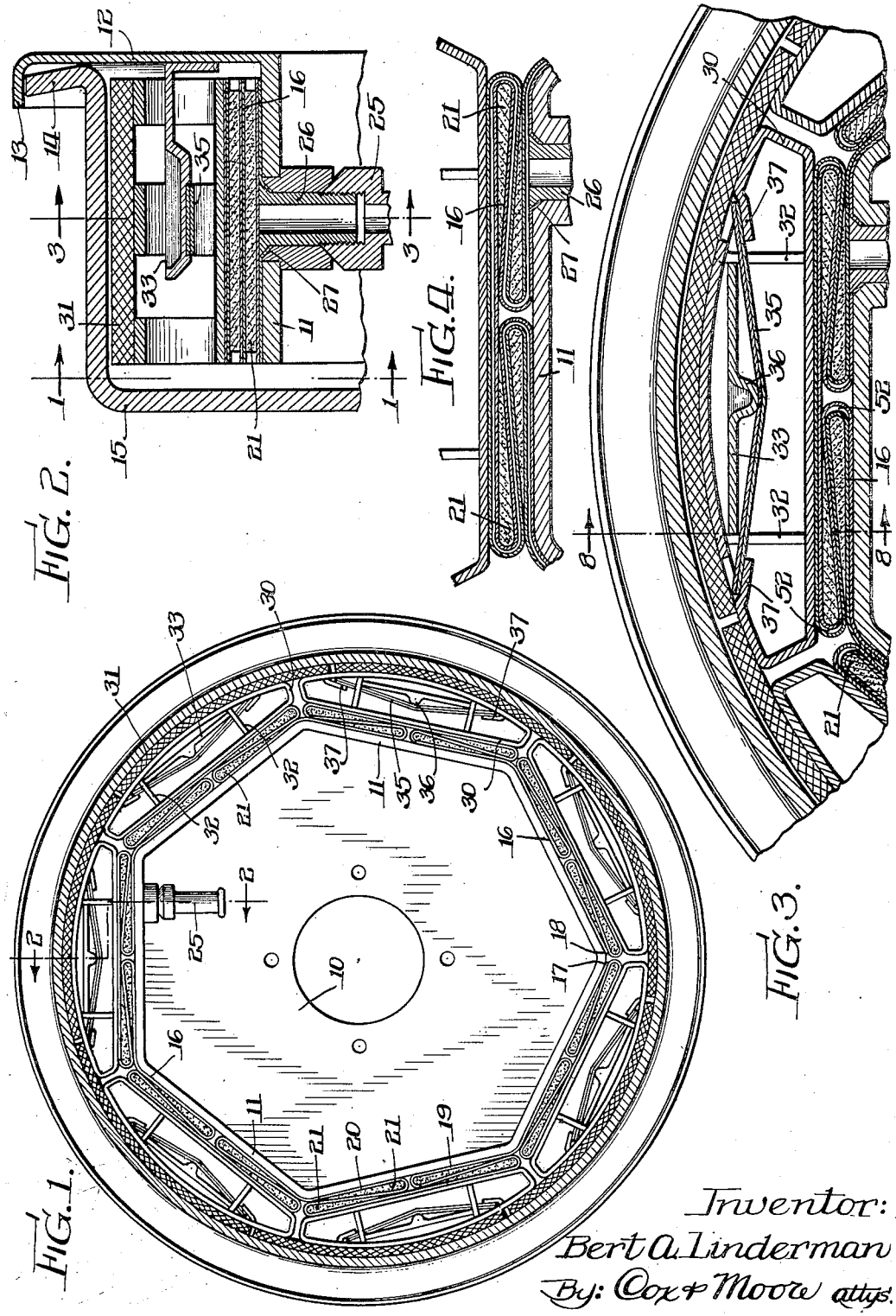
Inventor:
Bert A. Linderman
By: Cox & Moore attys.

July 18, 1939. B. A. LINDERMAN 2,166,165
FLUID OPERATED PRESSURE TRANSMISSION DEVICE
Filed July 5, 1935 2 Sheets-Sheet 2
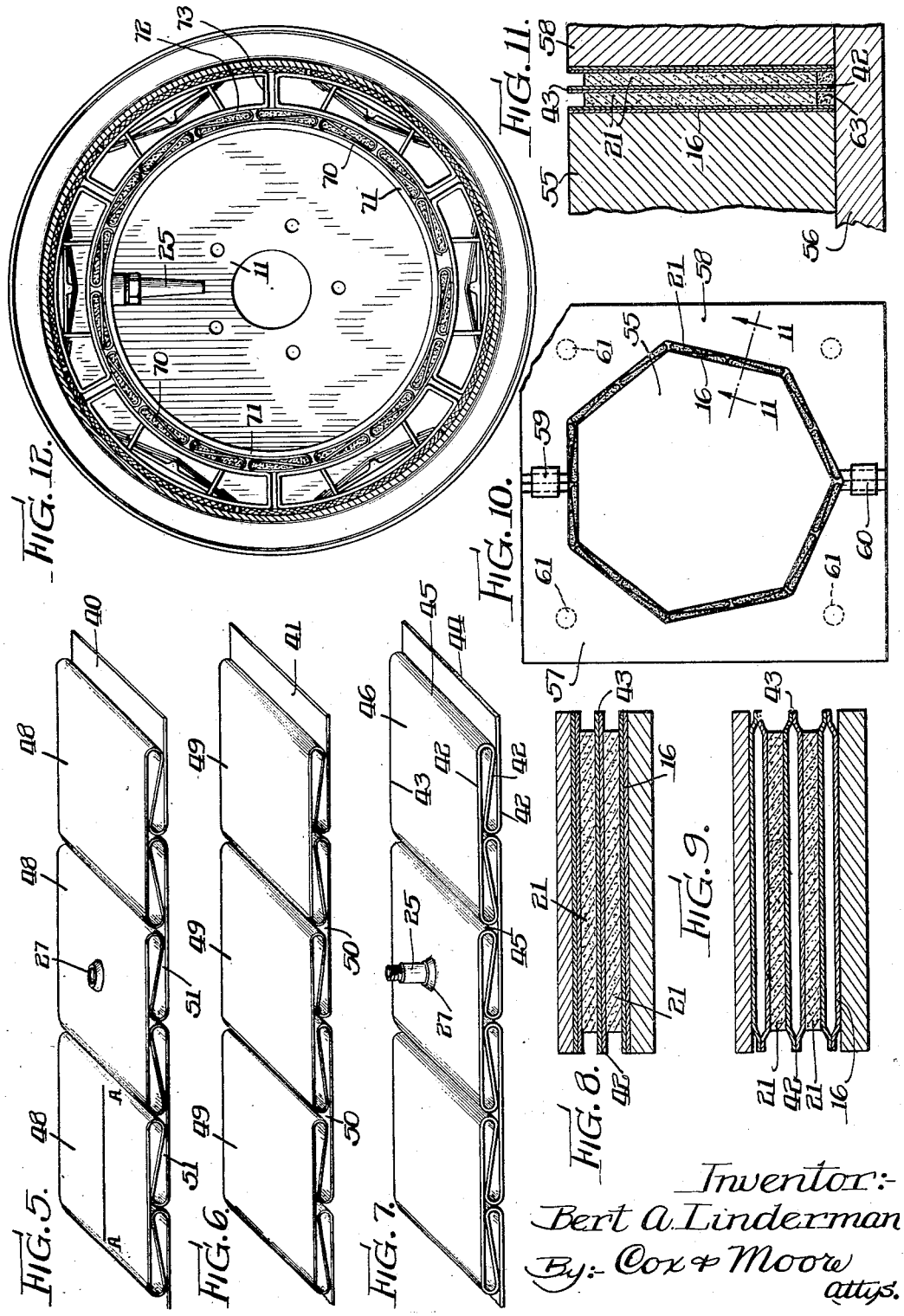
Inventor:-
Bert A. Linderman
By:- Cox & Moore
attys.

Patented July 18, 1939

2,166,165

UNITED STATES PATENT OFFICE 2,166,165

FLUID OPERATED PRESSURE TRANSMISSION DEVICE

Bert A. Linderman, Detroit, Mich.

Application July 5, 1935, Serial No. 29,833

12 Claims. (Cl. 137—157)

This invention relates to fluid pressure operated power transmitting devices and to the making and arranging of expansible diaphragm constructions for use with such devices.

It is an object of the invention to provide a new and improved fluid pressure operated power transmitting device, such as a brake or clutch, which may be readily and cheaply constructed, and which is wholly efficient in operation, particularly to provide in such a device a new and improved operating diaphragm construction.

Further objects are to provide, in a fluid operated brake or clutch device, a continuous diaphragm which extends entirely around the device or along an appreciable portion thereof circumferentially; to provide an elongated diaphragm which is compact and of relatively large effective operating area and which gives any desired amount of expansion; to provide a diaphragm composed of a plurality of diaphragm sections arranged in longitudinal continuation to form an elongated continuous diaphragmmatic construction; and to provide such a diaphragm in which each of said sections comprises a plurality of superposed expansible operating chambers.

Still further objects are to provide abutments for the operating diaphragm surfaces shaped to conform accurately thereto, and more particularly to provide in a diaphragm having superposed expansible operating chambers, filler members shaped to conform accurately to the operating surfaces of the diaphragm with which they engage whereby to reduce and eliminate lost or waste motion between the filler members and the diaphragm operating surfaces upon the expansion of the latter.

Other objects and advantages of the invention will appear from the following specification when taken in connection with the accompanying drawings wherein there are described and shown certain preferred embodiments of the invention.

In the drawings, wherein like reference numerals refer to like parts throughout:

Figure 1 is a transverse sectional view taken through a brake construction of the type particularly adapted for use with automotive vehicles, along the line 1—1 of Figure 2.

Figure 2 is a partial longitudinal section on an enlarged scale taken along the line 2—2 of Figure 1.

Figure 3 is a partial transverse section taken along the line 3—3 of Figure 2.

Figure 4 is a view similar to Figure 3 but showing the diaphragm in expanded position.

Figure 5 is a perspective view of one of the metallic plates of which the diaphragm is formed, showing the diaphragm at an intermediate stage of production.

Figure 6 is a similar perspective view of the other metallic diaphragm plate.

Figure 7 shows the diaphragm plates of Figures 5 and 6 in assembled relation.

Figure 8 is a sectional view through the diaphragm construction taken substantially along the line 8—8 of Figure 3.

Figure 9 is a view similar to Figure 8 but showing the diaphragm in expanded position.

Figure 10 is a plan view of the mold used in the casting of the filler members between the superposed diaphragm chambers.

Figure 11 is a partial sectional view of the mold taken along the line 11—11 of Figure 10, and Figure 12 shows a modified embodiment of the invention employing a circular form of diaphragm.

While the invention has been shown for the purpose of illustration as applied to a brake assembly for an automotive vehicle, it is to be understood that it is equally applicable to fluid pressure operated devices generally, including brakes and clutches, and that the diaphragm construction is likewise applicable generally to fluid pressure operated mechanisms.

The illustrated embodiment, referring first to Figures 1, 2, 3 and 4, comprises a support frame 10 adapted to be secured to the frame of a vehicle, adjacent the wheel thereof. Secured to the support frame is a laterally extending flange supporting structure 11. The flange is polygonal in shape circumferentially of the frame, and in the particular embodiment shown is illustrated as being heptagonal. However, it is to be understood that any polygonal form may be used. Extending outwardly from the flange 11 is an annular rim portion 12 bent laterally at its extreme outer end 13 to protect the edge 14 of the rotatable brake drum 15 which is adapted to be secured to the vehicle wheel and to rotate therewith. The portion 13 of the rim and the portion 14 of the brake drum form an effective seal for the exclusion of dirt, water, and the like from the interior of the brake structure. The expansible diaphragm 16 is carried by the flange 11 and is of corresponding polygonal form. The diaphragm comprises a pair of diaphragm plates secured together to form expansible fluid chambers. The diaphragm preferably comprises a single continuous structure extending entirely around the brake circumferentially and having its sealed ends in juxtaposition as indicated at 17 and 18. The plates are formed into a serpentine arrangement of continuous box plaits forming a plurality of diaphragm sections arranged in longitudinal continuation around the circumference of the brake structure. As illustrated, there are two diaphragm sections 19 and 20 upon each flat face of the frame 11, but a larger or smaller number of sections could be arranged on each flange face, if desired. Each diaphragm section comprises a plurality of superposed expansible chamber portions between which are arranged the filler members 21. As shown, each diaphragm section comprises three superposed expansible chambers having two filler members therebetween, but a larger number of superposed chambers could be formed, if desired, by increasing the number of folds of the diaphragm, in which event the number of interpositioned filler members would be correspondingly increased.

The terminal 25 which is adapted to be connected to the hose through which fluid, either liquid or air, is introduced from any suitable controlled fluid pressure source, has communication with the diaphragm at some intermediate point longitudinally thereof as best indicated in Figures 2 and 4. It is preferred that the terminal have connection with the diaphragm substantially midway of its length, as shown in Figure 1, as this tends to equalize the operating pressures which will be introduced into the diaphragm toward each end thereof. As indicated in Figures 2 and 4, a suitable opening is formed in the lower diaphragm plate for the reception of the head 26 of the terminal. The portions of this diaphragm plate adjacent the opening are bent into conical form as indicated at 27 to conform to the shaping of the head, and the diaphragm and head are then preferably welded together to form a fluid-tight joint.

The brake shoes 30 having the brake linings 31 suitably secured thereto, as by riveting or the like, are carried upon the diaphragm. Each of the brake shoes has a pair of vertically extending barriers 32 which engage upon either side of an abutment plate 33 rigidly secured to the rim 12 of the support frame. The barriers 32, by reason of their engagement with the plate 33, constrain the brake shoes for radial movement as the shoes and linings are moved outwardly into engagement with the brake drum by the expansion of the diaphragm. An elongated flexure spring 35 is provided for normally urging each brake shoe inwardly against the diaphragm. The spring bears outwardly at its central portion against a projection 36 provided at the center of the abutment plate 33 and inwardly at its ends against portions 37 struck inwardly from the outer surfaces of the brake shoe.

In operation, fluid is introduced into the diaphragm by means of terminal 25. The diaphragm thereupon expands, as shown in Figure 4, forcing the brake shoes outwardly away from the stationary support flange 11, thereby bringing the brake linings into frictional engagement with the rotatable brake drum 15. The brake shoes are constrained for radial movement and prevented from rotation with the brake drum by means of barriers 32 and abutment plates 33. Upon deflation of the diaphragm, the flexure springs 35 move the brake shoes away from the brake drum to release the latter for free rotation.

The method of making the diaphragm is best understood by reference to Figures 5, 6 and 7. One of the diaphragm plates 40 is first bent into a continuous series of box plaits to form an elongated serpentine structure as shown in Figure 5. The other diaphragm plate 41 is then bent into similar form, as shown in Figure 6, after which the plates are interfitted and welded continuously along their side edges 42 and 43, as indicated in Figure 7, to form the elongated series of multiple chamber expansible diaphragm sections. The ends of the diaphragm plates are also then welded together as indicated at 44. Prior to the interfitting and welding of the plates, the terminal 25 is secured in place to the plate 40.

The diaphragm may be formed, if desired, by first superposing the plates while in flat condition and thereafter bending them while together to form the diaphragm folds. In using this method of construction, the side edges of the plates may be welded together either before or after the bending process, but it is better to weld the edges after the bending as the bending tends to disrupt the pre-welded joints. When the plates are bent while together in superposed relation, corresponding diaphragm folds in the two plates will be substantially commensurate. That is, the plate surfaces in the completed diaphragm will be in contact throughout, at the bends 45 of the folds as well as at the flat plate portions 46. As a result, when using this method of construction, it is necessary to form corrugations in one of the diaphragm plates, particularly at the bends 45, to facilitate the transmission of fluid through the collapsed diaphragm.

It is, therefore, preferred to form the diaphragm by bending the two plates individually, after which they may be interfitted, as in the method of formation first described. In bending the plates individually in accordance with this method, the plates will be so bent that the plate portions 48 of the plate 40 will be of slightly greater length along the dimension A—A than the corresponding portions 49 of the plate 41; and the portions 50 of the plate 41 will be shaped to a greater length than the corresponding portions 51 of the plate 40. As a result a space 52 will be formed between the diaphragm plates at the ends 50 even in the collapsed diaphragm, as shown in Figure 3. This spacing facilitates the passage of fluid through the collapsed diaphragm and avoids the necessity of forming ribs in the diaphragm plates.

After the diaphragm plates are shaped and welded together, the filler members are formed between the expansible diaphragm chambers. The method of forming the filler members is best understood by reference to Figures 8, 9, 10 and 11. As illustrated in Figure 10, the mold apparatus utilized in the casting of the filler members comprises a central stationary block 55, fixed to a base 56, and a pair of movable blocks 57 and 58. The movable blocks are clamped together by clamps 59 and 60 and may be held in the proper spaced relation with respect to the fixed block 55, as shown in Figure 10, by means of pins 61 secured to the blocks and engageable within holes formed in the base 56. When the blocks are in the assembled operative position of Figure 10, they form therebetween an annular polygonal channel for holding the diaphragm in the position it will assume in the completed brake structure. In other words, the stationary block 55 is of substantially the same size and shape as the supporting flange 11, and the blocks 57 and 58 hold the diaphragm in completely collapsed position so that it will be held in the normal collapsed position which it will assume in the operative brake structure.

Sand or similar material 63 lies within the annular channel at the bottom thereof, and the bottom edges of the diaphragm are imbedded therein a suitable distance as indicated in Figure 11 so that the filler members, when formed, will be spaced slightly from the diaphragm edge. With the diaphragm arranged within the annular channel between the blocks and imbedded in the sand at its lower edges 42, the filler members 21 are formed by introducing suitable plastic material between the superposed diaphragm folds. The material is not introduced to the complete width of the diaphragm, but is left spaced downwardly slightly from the top edges 43, as indicated in Figure 11, thereby leaving the top diaphragm edges also free of the filler material. Any suitable material may be used to form the filler members which can be introduced between the folds of the diaphragm either by pouring or pressing the material in place while in a plastic condition, and which, upon being allowed to set, will harden into a non-compressible block of sufficient strength to withstand the operating pressures of the diaphragm, and of sufficient heat resistance to withstand the temperatures to which the diaphragm construction will be subjected in operation. Various forms of cements or resins or the like, for example, may constitute suitable filler material in various installations. Also, it is desirable and preferred to use a filler material which will adhere slightly to the diaphragm plates so that the fillers will remain throughout the life of the diaphragm in the same position relative to the diaphragm plates that they assume in the original forming operation. If necessary, the plates may be treated with a suitable adhesive prior to the introduction of the filler material to insure that the fillers will adhere to the plates.

Fillers produced as above in accordance with the principles of the invention are shaped accurately to conform to any irregularities which may exist in the diaphragm plates. The plates and filler surfaces are in absolute contact throughout their contacting surfaces. There will be no slight voids or open spaces between the filler members and the plates which voids would greatly tend to reduce the operating efficiency of the diaphragm construction. By reason of the fact that the fillers and diaphragm plates co-mate accurately, diaphragm operating pressures are obtained immediately upon the introduction of the fluid. There are no voids which, if present, would have to be taken up or filled by the expansion of the diaphragm before effective brake operating pressures could be obtained.

It is to be understood that the method of forming the fillers illustrated in Figures 10 and 11 shows but one suitable means for forming these members, and it is obvious that other means might be employed without departing from the spirit of the invention. The essential point is that the fillers shall be so formed that they co-mate accurately with the surfaces of the diaphragm plates with which they engage.

The operation of the filler members, upon expansion of the diaphragm, is illustrated in Figures 8 and 9. As will be seen from Figure 9, showing the diaphragm in expanded position, by reason of the fact that the filler members do not extend completely to the edges of the diaphragm, the adhesion between the fillers and the diaphragm plates does not interfere with diaphragm expansion.

In Figure 12 there is illustrated an embodiment of the invention employing a circular form of continuous diaphragm 70. In this form of the invention the supporting flange 71 carrying the diaphragm is circular and the inner faces 72 of the brake shoes 73 are arcuate to conform to the shape of the diaphragm. The remaining parts of this construction are the same as in the embodiment of the invention previously described, and the operation is the same. The methods of forming the diaphragm and the fillers are also the same, except that in this case the channel into which the diaphragm is placed in the mold, when the fillers are formed, will be circular and of a size corresponding to the size which the diaphragm will have in the completed construction. The construction of Figure 12 is particularly adapted for use where the required expansible movement of the diaphragm is not large.

In the improved brake unit, constructed in accordance with the invention, there is provided a continuous diaphragm which extends completely around the structure. The diaphragm may be readily formed of a single pair of metallic plates. The diaphragm construction is compact and yet it has a relatively large operating surface and readily provides any desired degree of expansion without danger of rupturing the diaphragm plates or the sealed joints formed therebetween. The total effective expansion of the diaphragm may be increased at will by increasing the number of superposed expansible chambers in each diaphragm section. The filler members are shaped to conform accurately to the diaphragm plate surfaces and thus insure immediate operating pressures upon the introduction of fluid into the diaphragm.

It is obvious that various changes may be made in the precise embodiments shown for the purpose of illustration and in the various method steps described without departing from the spirit of the invention. The invention is, therefore, not to be limited to the several embodiments and method steps shown and described, but only as indicated in the following claims.

The invention is hereby claimed as follows:

1. A fluid pressure operated power transmitting device comprising a pair of diaphragm plate members joined together at their edges and folded so as to form a plurality of communicating sections in longitudinal continuation, each of said sections comprising a plurality of superposed communicating expansible chambers.

2. A fluid pressure operated power transmitting device comprising a pair of diaphragm plate members joined together at their edges and folded so as to form a plurality of communicating sections in longitudinal continuation, each of said sections comprising a plurality of superposed communicating expansible chambers, and non-compressible filler members arranged between said superposed chambers.

3. A fluid pressure operated power transmitting device comprising a pair of diaphragm plate members joined together at their edges and folded so as to form a plurality of communicating sections in longitudinal continuation, each of said sections comprising a plurality of superposed communicating expansible chambers, and non-compressible filler members arranged between said superposed chambers, said filler members being of hardened plastic material whereby to have their surfaces shaped accurately to conform to irregularities in the chamber walls with which they engage.

4. In a fluid pressure operated power transmitting device, a pair of diaphragm plate members joined together at their edges and folded so as to form a plurality of communicating sections in longitudinal continuation, each of said sections comprising a plurality of interconnected superposed expansible chambers, and said sections being relatively polygonally arranged whereby to form an extended circumferential diaphragm structure.

5. A diaphragm comprising a pair of peripherally secured elongated plates formed into a series of continuous box plaits.

6. A diaphragm comprising a pair of elongated superposed plates bent and secured together to form a plurality of diaphragm chambers arranged as a continuous series of box plaits, said plates being relatively spaced at the bends therein whereby to facilitate fluid passage through the chambers.

7. In a fluid pressure operated power transmitting device, an operating diaphragm formed from metal plates, an abutment member having a surface in engagement with one of said plates, said abutment member being formed of hardened plastic material whereby said surface will be shaped accurately to conform to irregularities in the metal surface of said plate.

8. A fluid pressure operated power transmitting device comprising a pair of diaphragm plate members joined together at their edges and folded so as to form a series of laterally displaced juxtaposed communicating sections, each of said sections comprising a plurality of superposed connected expansible chambers, one of said sections being horizontally disposed with respect to a second of said sections and angularly disposed with respect to a third of said sections.

9. A fluid pressure operated power transmitting device comprising a pair of diaphragm plate members joined together at their edges and folded so as to form a plurality of communicating sections in longitudinal continuation, each of said sections comprising a plurality of superposed communicating expansible chambers, said sections being relatively angularly disposed.

10. A fluid pressure operated power transmitting device comprising a pair of diaphragm plate members joined together at their edges and folded so as to form a plurality of laterally disposed communicating sections in longitudinal continuation, each of said sections comprising a plurality of superposed communicating expansible chambers.

11. A fluid pressure operated power transmitting device comprising a diaphragm structure having a pair of diaphragm plate members joined together at their edges and folded so as to form a plurality of communicating sections in longitudinal continuation, each of said sections comprising a plurality of superposed communicating expansible chambers, said plates forming a circular diaphragm structure.

12. A diaphragm comprising a pair of diaphragm plate members joined together at their edges and folded in the form of a box plait.

BERT A. LINDERMAN.